United States Patent Office 3,551,025
Patented Dec. 29, 1970

3,551,025
HIGHLY FLEXIBLE REFLEX REFLECTING CONSTRUCTIONS
Wallace Karl Bingham, Woodbury, and Robert C. Vanstrum, White Bear Lake, Minn., assignors to Minnesota Mining and Manufacturing Company, St. Paul, Minn., a corporation of Delaware
No Drawing. Filed Mar. 28, 1969, Ser. No. 811,568
Int. Cl. G02b 5/12
U.S. Cl. 350—105          6 Claims

ABSTRACT OF THE DISCLOSURE

A highly flexible, reflex reflective construction comprising a layer of reflex reflecting transparent spheres in a binder and a continuous overlying transparent solid topcoat having a flat front face, said binder being a transparent elastomeric composition having a refractive index sufficiently low that the ratio of the refractive index of the transparent spheres to that of the binder is between 1.85 and 2, the refractive index of said transparent spheres being at least about 2.4, said topcoat being a transparent elastomeric composition having a Shore A hardness above 40, both said topcoat and said binder having a tensile strength at break of at least 200 p.s.i. at 75° F. and a glass transition temperature below 10° C., the maximum strain at break of the topcoat being attained at a temperature not more than 30° C. higher than the maximum strain at break of the bead binder.

---

This invention relates to reflex reflecting constructions which are highly flexible. In one aspect this invention relates to reflex reflective material or sheeting which can be flexed to assume or conform to irregular shapes or to be mounted on irregular surfaces.

Reflex reflecting contructions containing a beaded front face have been in use for many years and some varieties have been used in the manufacture of garments, as in U.S. Patent 2,567,233. To avoid the problems associated with rain or spray contacting the front surface and markedly reducing the reflex reflecting action and night visibility it has been common practice to overcoat the beaded layer with a continuous, transparent solid covering or "topcoat," providing a flat front face sealing the beaded surface from the atmosphere and/or providing a protective coating thereon, such being here referred to as "topcoat" or "topcoated" constructions. This type of reflex reflector is described in U.S. Patent 2,407,680, and further "topcoat" structures are illustrated in U.S. Patents 2,713,286; 3,025,764; and 3,413,058. Although many of these topcoat constructions have been flexible, they have not been sufficiently pliable for use in those applications requiring conformity to a complex or irregular shape and resistance to cracking upon repeated or severe flexing, particularly over an extended range of temperature.

The flexibility of known topcoated reflex reflective constructions is limited in several ways. Cracks or fissures can develop from flaws or stress induced defects either in the topcoat layer or in the adjacent glass bead binder layer. Growth of cracks or fissures which produce light diffraction and loss of optical efficiency may be initiated within the topcoat or the bead binder layers when the ultimate fracture properties of either layer is exceeded. Inadequate creep resistance and/or low temperature embrittlement of either layer can cause failure. Even if the ultimate fracture properties of each layer are not exceeded, a problem occurs if the topcoat separates or delaminates from the bead binder layer, since the resulting voids will degrade the optical properties of the reflex reflective construction. Such separation results from strain developed at the topcoat-bead binder interface as a result of severe flexing or stretching of the construction and resulting adhesion failure between the two layers.

Because the bead binder in such topcoated constructions should have a relatively low index of refraction if a space coat between the bead and the specular reflector is to be avoided, choice of materials is somewhat limited. The highly fluorinated polymers are particularly suitable in this regard. However, the difficulty in adhering another polymer layer to a highly fluorinated polymer surface is well known, and the use of special adhesive layers or treatments is generally to be avoided because of their effect on the optical properties of the construction.

It has now been found that highly flexible, topcoated reflex reflective composites or constructions can be prepared by particular selection and careful control of the bead binder and topcoat material, this construction comprising a layer of small transparent reflex reflective spheres or beads in an elastomeric bead binder and a continuous transparent topcoat. As used herein, "elastomer" and "elastomeric" is defined by ASTM Special Technical Bulletin No. 184, which reads "A substance that can be stretched at room temperature to at least twice its original length and, after having been stretched and the stress removed, returns with force to approximately its original length in a short time."

The binder for the transparent spheres is a transparent elastomeric composition (including homogeneous admixtures) having a sufficiently low refractive index such that the ratio of refractive index of the transparent spheres to the refractive index of the elastomeric binder is between about 1.85 to 2 with the refractive index of the transparent spheres being at least about 2.4, preferably at least 2.48.

The binder must have the ability to be flexed without affecting its adhesion to or ability to maintain contact with the transparent spheres, and an elastomeric composition having a permanent set at break no greater than about 30% is preferred. The elastomeric binder need not necessarily be colorless, and in certain instances it may be colored, e.g. by incorporation of a dye. Of particular value for the binder are the highly fluorinated elastomers, preferably elastomers in which at least 50% of the carbon atom substituents are fluorine, such as the elastomeric copolymers of vinylidene fluoride and at least one monomer from the group consisting of perfluoropropene, tetrafluoroethylene, and 3 - hydroprefluoropropene-1 (i.e. $CF_2=CFCHF_2$). Particularly preferred are the fluorinated elastomers produced by copolymerizing perfluoropropene and vinylidene fluoride, as described in U.S. Patents 3,051,677 issued Aug. 28, 1962, and 3,318,854 issued May 9, 1967 and those terpolymers produced by copolymerizing perfluoropropene, vinylidene fluoride and tetrafluoroethylene as described in U.S. Patent 2,968,649 issued Jan. 17, 1961. Also useful are the carboxy terminated fluoroelastomers of U.S. Patent 3,438,953 and the nitroso fluoroelastomers of U.S. Patents 3,080,347; 3,321,454 and 3,399,180. The elastomeric copolymers of perfluoropropene and vinylidene fluoride having between about 15 and about 50 mole percent perfluoropropene are outstanding in this respect.

The topcoating material is a transparent elastomeric composition (including homogeneous admixtures) having a hardness greater than a Shore A durometer of 40. An essentially amorphous elastomer which does not develop crystallinity, and hence does not opacify, upon elongation up to at least 50% is preferred when severe flexing is anticipated. Illustrative elastomers include the abovementioned highly fluorinated elastomers as well as more conventional unflourinated elastomers, e.g. polyurethanes, etc. and the epoxy-amine elastomer of U.S. Ser. No. 496,139, filed Oct. 14, 1965, and its foreign counterpart, Italian Patent 761,529.

It is important that the topcoating elastomer composition and the binder elastomer composition both have an elongation at break of at least 50% and a tensile strength at break of at least 200 p.s.i. at 75° F. and a glass transition temperature (Tg) less than 10° C. Since the construction must flex with a minimum of stress at the interface between the topcoating and the binder, excessive stress tending to cause delamination or "breaking waay" of the one from the other at that interface with a resulting loss in optical properties of the overall construction, it is important that the maximum strain at break of the topcoat elastomer composition be attained at a temperature not more than 30° C. higher than the maximum strain at break of the bead binder elastomer composition, preferably not more than 10° C. higher, since it has been found that the interfacial stress between the topcoat and the bead binder layers is thereby maintained low enough to reduce the tendency of the layers to separate upon flexing over the range of normal temperatures. Maximum strain at break is determined by plotting strain at break vs. the log of the reduced strain rate, the reduced strain rate being the product of the Williams-Landel-Ferry shift factor and the strain rate at a given temperature, as described in "Fracture Processes in Polymeric Solids," chapter III, part B, under the heading "Rupture of Amorphous Unfilled Polymers," edited by B. Rosen, published by John Wiley and Sons (New York—1964). Ordinarily the maximum strain at break is observed at a temperature of about 30° C. above the glass transition temperature (Tg) of the elastomer. It is also generally desirable to select elastomers having an elongation at break differing by no more than 100%, preferably no more than 50% for the binder and the topcoat, with the bead binder elastomer having the greater elongation at break value if any difference exists.

Since the highly flexible, topcoated constructions of this invention retain their flexibility and resistance to cracking upon flexing even at temperatures of 10° C. and lower, they can be bonded or laminated to a wide variety of substrates not suitable for the previously known topcoated constructions. Not only can they be mounted on complex curved or angled surfaces, but they can be applied to flexible substrates, such as cloth, non-woven fabrics, leather, paper etc., without significant loss of the normal flexibility of the chosen substrate. This is especially valuable in the manufacture of reflectorized fabric for use in wearing apparel or garments which are desirably supple and have good "hand" or "drape". Because they retain their optical efficiency even after distention at low temperatures, they may be folded, stretched and wrapped securely and snugly around articles to be reflectorized. When they are bonded to a stretchable fabric (e.g. "Spandex") or film, the entire reflex reflection composite can be reversibly elongated without loss of optical efficiency of the reflex reflective elements, although elongation does result in a somewhat less number of reflex reflective elements per unit area. With all of the constructions of this invention the spheres or beads are preferably hemispherically coated with a specular reflector, e.g. vapor-deposited or chemically deposited metal such as aluminum, or have specularly reflecting material, e.g. aluminum flake, adjacent the hemispherical surfaces opposite the topcoat; in both instances the specular reflective material is therefore in close proximity to the bead surface so that an intermediate "space coat" to control their relative positioning is not needed. If a "space coat" is used, elongation of the bead binder layer will cause distortion of this critical "space coat" by altering the separation or spacing between the bead surface and the specular reflective material, thereby producing a corresponding loss in optical efficiency.

The following examples will illustrate the elastomeric, topcoated constructions of this invention. In each example, the elastomeric topcoat layer and the elastomeric bead binder layer met the critical criteria set forth above.

EXAMPLE 1

The following solution is cast onto a polyethylene coated kraft paper as a 10 mil thick layer.

| | Parts by weight |
|---|---|
| Thermoplastic polyester polyurethane ("Estane 5713," a trademarked product of B. F. Goodrich Company) | 12 |
| Methyl ethyl ketone | 52 |
| Dimethyl formamide | 14 |
| A medium molecular weight copolymer of 86 weight percent vinyl chloride, 13 weight percent vinyl acetate and about 1 weight percent maleic acid | 12 |
| | 100 |

This cast layer is dried at 150° F. (65.5° C.) for 5 minutes and 200° F. (93.3° C.) for 10 minutes, producing an elastomeric layer on the kraft paper. A 3 mil thick second layer is cast onto the first layer, using a 30 weight percent solution of vinylidene fluoride-perfluoropropene elastomer ("Viton–A," a trademarked product of E. I. du Pont de Nemours & Company, 1.39 refractive index at 25° C.) in methyl isobutyl ketone. This second layer is dried at 125° F. (51.6° C.) for 3 minutes and then coated with a layer of glass beads (50 micron average diameter, 2.61 refractive index). The glass beads are nipped into the coating by squeezing between the metal hot can and a rubber nip roll. Following the bead coating a further cure is given at 180° F. (82.2° C.) for 4 minutes. A specularly reflective aluminum layer is applied over the exposed bead surfaces by vapor deposition, and a 15 mil wet coating of the following adhesive is then deposited on the aluminum coated beads:

| | Parts by weight |
|---|---|
| Toluol | 18.63 |
| Methyl ethyl ketone | 34.84 |
| Dioctyl phthalate | 17.94 |
| Epoxy resin stabilizer ("Ferro 900," a trademarked product of Ferro Corporation) | .32 |
| A solution of barium/cadmium salt of a carboxylic acid and an organic inhibitor (Ferro 1203," a trademarked product of Ferro Corporation) | .32 |
| Cadmium organic inhibitor and resin stabilizer ("Ferro 203," a trademarked product of Ferro Corporation) | .43 |
| Vinyl chloride/vinyl acetate copolymer (87/13 weight ratio) (VYHH) | 26.98 |
| Aluminum powder | .54 |
| | 100.00 |

This coating is then dried at 120° F. (48.8° C.) for 2 minutes and 175° F. (79.4° C.) for 8 minutes, and a 2 mil polyethylene film is laminated to the adhesive as a protective liner.

To use the resulting construction the protective liner is stripped from the adhesive layer, and the adhesive is placed against a cloth substrate. The lamination to the cloth uses either a heated iron at 270–310° F. (134–154° C.) or in a heat lamp-vacuum bag applicator. Finally the kraft paper is removed from the face of the construction after it has cooled. The cloth laminate is highly flexible and retains much of the fabric "feel" of the cloth substrate.

EXAMPLE 2

A procedure identical to that described in Example 1 is used, except that the first coating cast on the polyethylene-coated kraft paper is a 30 weight percent solution of vinylidene fluoride-perfluoropropene elastomer ("Viton–A," a trademarked product of E. I. du Pont de Nemours & Company) in methyl isobutyl ketone. The resulting reflex reflective construction is highly flexible and is capable of conforming to curved and complex surfaces.

EXAMPLE 3

A procedure identical to that described in Example 1 is used, except that the first coating contains a thermoplastic polyester polyurethane having high tensile strength at high elongation ("Estane 5740–X140," a trademarked product of B. F. Goodrich Company) instead of the somewhat lower molecular weight polyester polyurethanes of Example 1 (i.e. "Estane 5713"). The resulting highly flexible reflex reflective construction has a somewhat harder topcoat, which is desirable in some instances to minimize dirt pick-up during outdoor exposure.

EXAMPLE 4

A construction very similar to that shown in Example 1 is made, with the only difference being the face film; i.e., the first layer cast onto the polyethylene-coated kraft paper, which film consists of a polyurethane prepolymer cured with 1–4 butanediol in the ratio 100 parts prepolymer to 6 parts of the diol. The urethane prepolymer is prepared as follows:

(A)

| Charge: | Parts by weight |
|---|---|
| Poly - epsilon - caprolactone diol of average molecular weight=1250 | 45.22 |
| Poly - epsilon - caprolactone diol of average molecular weight=2000 | 15.07 |
| A polyoxypropylene derivative of trimethylolpropane with an average molecular weight of 418, hydroxyl number of 404 and an acid number of .03 | 3.02 |

(B)

| Cellosolve acetate | 3.03 |
|---|---|

(C)

| 4,4' - methylene-bis-(cyclohexylisocyanate) of molecular weight 262.4 and equivalent weight of 131.2 | 30.15 |
|---|---|

(D)

| Dibutyltin dilaurate (20% in Cellosolve acetate) | 1.51 |
|---|---|

(E)

| 2,4 dihydroxy-benzophenone | .93 |
|---|---|

(F)

| 2,6 di-tert-butyl-4 methylphenol | .47 |
|---|---|

(G)

| Cellosolve acetate | 2.00 |
|---|---|

Charge A to a clean, dry 20 gallon reactor kettle. Vacuum strip any moisture present at 5 mm. Hg pressure and 190° F. for 2 hours. Add Charge B with stirring, then Charge C, holding temperature at 190° F. Add Charge D at the rate of .10 lb. every 4 minutes until the entire charge has been added. Hold temperature between 190–200° F. during this addition. It will usually be necessary to add cooling fluid to the reactor jacket to keep the temperature within these limits. Charges E and F are dissolved in Charge G and the entire solution is then added to the reactor kettle. Reaction is allowed to continue for 4 hours, whereupon the prepolymer is drained and packaged in air tight containers. The prepolymer has an NCO number of 880 and a viscosity of 9000 cps. at 150° F. The mixture of prepolymer and 1,4-butanediol is cast onto a polyethylene-coated kraft paper with a knife coater at 10 mils wet thickness. The coated web is then placed in a 130° F. oven for 5 minutes, then a 180° F. oven for 10 minutes. Following this topcoat layer a bead bond layer and an adhesive layer are coated in exactly the same manner as in Example 1. The resulting construction, laminated to cloth, was extremely flexible and retained the "hand" of the cloth substrate.

What is claimed is:

1. A highly flexible, reflex reflective construction comprising a layer of reflex reflecting transparent spheres in a binder and a continuous overlying transparent solid topcoat having a flat front face, said binder being a transparent, highly fluorinated elastomeric composition having a refractive index sufficiently low that the ratio of the refractive index of the transparent spheres to that of the binder is between 1.85 and 2, the refractive index of said transparent spheres being at least about 2.4, said topcoat being a transparent elastomeric composition having a Shore A hardness of 40, both said topcoat and said binder having a tensile strength at break of at least 200 p.s.i. at 75° F. and a glass transition temperature below 10° C., the maximum strain at break of the topcoat being attained at a temperature not more than 30° C. higher than the maximum strain at break of the bead binder.

2. The construction of claim 1 in which said binder comprises an elastomeric copolymer of vinylidene fluoride and at least one comonomer selected from the group consisting of perfluoropropene, tetrafluoroethylene and 3-hydroperfluoropropene.

3. The construction of claim 1 in which said elastomeric topcoat composition is an essentially amorphous polymer which does not opacify upon elongation up to 50%.

4. The construction of claim 1 adhered to a flexible substrate.

5. The construction of claim 1 adhered to a fabric.

6. The construction of claim 1 adhered to a stretchable fabric.

References Cited

UNITED STATES PATENTS

| 2,407,680 | 9/1946 | Palmquist et al. | 350—105 |
|---|---|---|---|
| 2,567,233 | 9/1951 | Palmquist et al. | 350—105 |
| 3,025,764 | 3/1962 | McKenzie | 350—105 |
| 3,065,559 | 11/1962 | McKenzie | 350—105X |
| 3,080,347 | 3/1963 | Sandberg et al. | 260—80.77 |
| 3,318,850 | 5/1967 | Stilmar | 260—80.77X |
| 3,399,180 | 8/1968 | Crawford | 260—92.1 |
| 3,413,058 | 11/1968 | Tung et al. | 350—105 |

PAUL R. GILLIAM, Primary Examiner